US011515646B2

United States Patent
Han et al.

(10) Patent No.: US 11,515,646 B2
(45) Date of Patent: Nov. 29, 2022

(54) INTEGRATED CIRCUIT-TO-WAVEGUIDE SLOT ARRAY COUPLER

(71) Applicant: Massachusetts Institute of Technology, Cambridge, MA (US)

(72) Inventors: Ruonan Han, Winchester, MA (US); Cheng Wang, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 40 days.

(21) Appl. No.: 17/074,918

(22) Filed: Oct. 20, 2020

(65) Prior Publication Data
US 2021/0126378 A1    Apr. 29, 2021

Related U.S. Application Data

(60) Provisional application No. 62/925,382, filed on Oct. 24, 2019.

(51) Int. Cl.
| | |
|---|---|
| *H01Q 21/00* | (2006.01) |
| *H04B 3/52* | (2006.01) |
| *H01P 3/02* | (2006.01) |
| *H01Q 21/06* | (2006.01) |

(52) U.S. Cl.
CPC ......... *H01Q 21/0075* (2013.01); *H01P 3/026* (2013.01); *H01Q 21/064* (2013.01); *H04B 3/52* (2013.01)

(58) Field of Classification Search
CPC .. H01Q 21/0075; H01Q 21/064; H01P 3/026; H01P 5/107; H04B 3/52
See application file for complete search history.

(56) References Cited

U.S. PATENT DOCUMENTS

| | | | |
|---|---|---|---|
| 5,838,206 A | 11/1998 | Busca et al. | |
| 7,808,439 B2 | 10/2010 | Yang et al. | |
| 9,379,446 B1* | 6/2016 | Schuss | ................... H01Q 13/18 |
| 10,739,728 B2 | 8/2020 | Han et al. | |
| 11,342,684 B2* | 5/2022 | Wang | ........................ H01Q 1/32 |
| 2004/0155723 A1* | 8/2004 | Koriyama | ............... H01P 5/107 |
| | | | 333/26 |
| 2006/0158172 A1 | 7/2006 | King | |
| 2007/0063914 A1* | 3/2007 | Becker | ................... H01P 5/103 |
| | | | 343/840 |
| 2007/0170981 A1 | 7/2007 | Burt et al. | |
| 2007/0247241 A1 | 10/2007 | Braun et al. | |
| 2009/0122775 A1 | 5/2009 | Haartsen | |

(Continued)

OTHER PUBLICATIONS

U.S. Non-Final Office Action dated Apr. 14, 2021 for U.S. Appl. No. 17/071,319; 12 pages.

(Continued)

*Primary Examiner* — Dac V Ha
(74) *Attorney, Agent, or Firm* — Daly, Crowley, Mofford & Durkee, LLP

(57) ABSTRACT

A coupler comprising a silicon substrate with one or more double slot radiators configured to transmit or receive an RF signal, a slot balun circuit configured to isolate the RF signal, and a grounded coplanar waveguide configured to propagate the RF signal in a horizontal direction. The coupler can be included on an integrated chip with a second coupler and the chip can be positioned over two waveguides such that each coupler is positioned within the center of each waveguide aperture.

12 Claims, 10 Drawing Sheets

(56) References Cited

U.S. PATENT DOCUMENTS

| | | |
|---|---|---|
| 2010/0111750 A1 | 5/2010 | Touchberry et al. |
| 2012/0086114 A1 | 4/2012 | Zhao et al. |
| 2013/0316659 A1 | 11/2013 | Ylamurto |
| 2014/0086364 A1 | 3/2014 | Schell et al. |
| 2014/0267129 A1 | 9/2014 | Rebeschi et al. |
| 2015/0133068 A1 | 5/2015 | Aggarwal et al. |
| 2016/0181681 A1 | 6/2016 | Sarabandi et al. |
| 2016/0190670 A1 | 6/2016 | Carmon et al. |
| 2017/0019189 A1* | 1/2017 | Henry .................. H01P 3/127 |
| 2018/0041166 A1 | 2/2018 | Han et al. |
| 2018/0278441 A1 | 9/2018 | Ross et al. |
| 2019/0058479 A1 | 2/2019 | Mo et al. |
| 2019/0235445 A1 | 8/2019 | Han et al. |
| 2020/0235454 A1* | 7/2020 | Nakajima .............. H01P 5/107 |
| 2020/0243967 A1* | 7/2020 | Sipp ...................... H01Q 3/267 |

OTHER PUBLICATIONS

Response to Non-Final Office Action filed Jun. 18, 2021 for U.S. Appl. No. 17/071,319; 10 Pages.

Notice of Allowance dated Sep. 30, 2021 for U.S. Appl. No. 17/071,319, 12 Pages.

U.S. Appl. No. 17/071,319, filed Oct. 15, 2020, Han, et al.

Antonio, et al.; "Frequency stabilization in nonlinear micromechanical oscillators"; Nature Communications; 3:806; May 1, 2012; 6 Pages.

Bottom; "A History of the Quartz Crystal Industry in the USA"; Proceedings of the 35th Annual Frequency Control Symposium; pp. 3-12; May 1981; IEEE; 15 Pages.

Camparo; "The rubidium atomic clock and basic research"; 2007 American Institute of Physics; S-0031; Nov. 2007; 12 Pages.

Cox; et al.; "Zeeman Effect of Some Linear and Symmetric-Top Molecules"; Physical Review; vol. 101; No. 4; Feb. 15, 1956; pp. 1298-1304; 7 Pages.

Cyr, et al.; "All-optical microwave frequency standard: a proposal"; IEEE Transactions on Instrumentation and Measurement; vol. 42; No. 2; Apr. 1993; pp. 640-649; 10 Pages.

DeNatale, et al.; "Compact, low-power chip-scale atomic clock"; 2008 IEEE/ION Position, Location and Navigation Symposium; May 5, 2008; pp. 67-70; 4 Pages.

Esnault, et al.; "A compact cold-atom frequency standard based on coherent population trapping"; Frequency Control Symposium (FCS); 2012 IEEE International, May 2012; pp. 1-3; 3 Pages.

Essen, et al.; "An atomic standard of frequency and time interval: a caesium resonator"; 1955 Nature Publishing Group; Aug. 13, 1955; vol. 176; pp. 280-282; 3 Pages.

Essen; "Frequency Standardization"; Proc. IEE—Part II; Power Eng.; Jan. 1951; pp. 154-164; 11 Pages.

Fernández, et al.; "CSAC characterization and its impact on GNSS clock augmentation performance"; Sensors 2017; 17; 370; www.mdpi.com/journal/sensors; Feb. 14, 2017; 19 Pages.

Good; "The inversion spectrum of ammonia"; 1946 American Physical Society; Phys. Rev. 70; 213; Aug. 1, 1946; http://courses.washington.edu/phys432/NH3/ammonia_inversion.pdf; 22 Pages.

Haesler, et al.; "The integrated swiss miniature atomic clock"; 2013 Joint IEEE Ultrasonics, Ferroelectrics and Frequency Control Society (UFFC), European Frequency and Time Forum (EFTF), and Piezoresponse Force Microscopy (PFM) Symposium; pp. 579-581; 2013 IEEE; 3 Pages.

Hershberger, et al.; "servo theory applied to frequency stabilization with spectral lines"; Journal of the Franklin Institute; vol. 249; Issue 5; May 1950; pp. 359-366; 8 Pages.

Jet Propulsion Laboratory; Molecular Spectroscopy Catalog; https://spec.jpl.nasa.gov/; 1 Page.

Koshelev, et al.; "Speed dependence of collisional relaxation in ground vibrational state of OCS: Rotational behavior"; The Journal of Chemical Physics 136; Mar. 30, 2012; 12 Pages.

Lutwak; "The chip-scale atomic clock—recent developments"; 2009 IEEE International Frequency Control Symposium Joint with the 22nd European Frequency and Time Forum; Apr. 20, 2009; pp. 573-577; 5 Pages.

Lutwak; "The SA.45S chip-scale atomic clock—early production statistics"; Proceedings of the 43rd Annual Precise Time and Time Interval Systems and Applications Meeting; Nov. 14, 2011; pp. 207-220; 12 Pages.

Microsemi; "shock and vibration testing of the SA.45s chip scale atomic clock (CSAC) validation build units"; Aug. 2014; White Paper; 36 Pages.

Microsemi; Quantum™; "SA.54s chip scale atomic clock"; Jan. 2017; Data Sheet; 4 Pages.

Nguyen et. al.; "Towards chip-scale atomic clocks"; 2005 IEEE International Solid-State Circuits Conference (ISSCC); Feb. 7, 2005; Digest of Technical Papers; pp. 84-85; 2 Pages.

Rautian; "The Effect of Collisions on the Doppler Broadening of Spectral Lines"; Soviet Physics Uspekhi; vol. 9; No. 5.; Mar.-Apr. 1967; pp. 701-716; 17 Pages.

Ruffieux, et al.; "A Low-Power Fully Integrated RF Locked Loop for Miniature Atomic Clock"; 2011 IEEE International Sold-Sate Circuits Conference (ISSCC); pp. 48-49; Feb. 21, 2011; 3 Pages.

Supplee, et al.; "Theoretical description of frequency modulation and wavelength modulation spectroscopy"; Applied Optics; vol. 33; No. 27; Sep. 20, 1994; pp. 6294-6302; 9 Pages.

Townes; "Atomic clocks and frequency stabilization on microwave spectral lines"; Journal of Applied Physics; vol. 22; No. 11; Nov. 1951; pp. 1365-1372; 9 Pages.

Vanier, et al.; "On the signal-to-noise ratio and short-term stability of passive rubidium frequency standards"; IEEE Transactions on Instrumentation and Measurement; vol. IM-30; No. 4, Dec. 1981; pp. 277-282; 6 Pages.

Wang, et al.; "Rapid and Energy-Efficient Molecular Sensing Using Dual mm-Wave Combs in 65nm CMOS: A 220-to-320GHz Spectrometer with 5.2mW Radiated Power and 14.6-to-19.5dB Noise Figure"; 2017 IEEE International Solid-State Circuit Conference (ISSCC); Feb. 7, 2017; pp. 18-20; 3 Pages.

Wang, et al.; "Robust sub-harmonic mixer at 340 GHz using intrinsic resonances of hammer-head filter and improved diode model"; Journal of Infared, Millimeter, and Terahertz Waves; Nov. 2017; vol. 38; Issue 11; pp. 1397-1415; 19 Pages.

Wang, et al; "Duel-Terahertz-Comb Spectrometer on CMOS for Rapid, Wide-Range Gas Detection with Absolute Specificity"; IEEE Journal of Solid-State Circuits (JSSC); vol. 52; No. 12; Dec. 2017; pp. 3361-3372; 12 Pages.

Wineland et al.; "Results with the special-purpose ammonia frequency standard"; 31st Annual Symposium on Frequency Control; Jun. 1, 1977; pp. 562-573; 12 Pages.

Wineland et al.; "Special Purpose Ammonia Frequency Standard—A Feasibility Study"; IEEE TraSnsactions on Instrumentation and Measurement; vol. IM-28; No. 2; Jun. 1979; pp. 122-132; 11 Pages.

Youngner, et al.; "A manufacturable chip-scale atomic clock"; Transducers & Eurosensors 2007; The 14th International Conference on Solid-State Sensors, Actuators and Microsystems, Lyon, France; Jun. 10, 2007; pp. 39-44; 2007 IEEE; 6 Pages.

PCT International Search Report dated Mar. 6, 2019 for International Application No. PCT/US2018/067642; 4 Page.

PCT International Written Opinion dated Mar. 6, 2019 for International Application No. PCT/US2018/067642; 5 Pages.

Kabourek et al.; "Prague's Emission Fourier Transform Microwave Spectrometer—Design and Preliminary Results"; Radioengineering; vol. 22; No. 4; Dec. 1, 2013; [Retrieved on Feb. 24, 2019]; Retrieved from the Internet: <URL: https://www.radioeng.cz/fulltexts/2013/13_04_1288_1295.pdf>; 8 Pages.

Wang et al.; "High-Stability, Miniature Terahertz Molecular Clock on CMOS"; MTL Annual report; Jul. 2017; [Retrieved on Feb. 24, 2019]; Retrieved from the Internet: <URL: https://mtlsites.mit.edu/annual_reports/2017/circuits.pdf> p. 36; 1 Page.

PCT International Search Report and Written Opinion dated Jan. 15, 2021 for International Application No. PCT/US2020/055663; 15 pages.

Zhang, "Substrate Integrated Waveguide Devices and Receiver Systems for Millimeter-Wave Applications;" Département de génie électrique Polytechnique de Montréal; Sep. 2011; 44 pages.

(56) References Cited

OTHER PUBLICATIONS

Eshrah, et al., "Analysis of Waveguide Slot-Based Structures Using Wide-Band Equivalent-Circuit Model;" IEEE Transactions on Microwave Theory and Techniques; vol. 52, No. 12; Dec. 2004; 6 pages.
PCT International Search Report and Written Opinion dated Feb. 9, 2021 for International Application No. PCT/US2020/056441; 17 pages.

* cited by examiner

INTEGRATED CIRCUIT-TO-WAVEGUIDE SLOT ARRAY COUPLER

CROSS-REFERENCE TO RELATED APPLICATIONS

This application claims the benefit under 35 U.S.C. § 119 of provisional patent application No. 62/925,382 filed on Oct. 24, 2019, which is hereby incorporated by reference herein in its entirety.

GOVERNMENT RIGHTS

This invention was made with Government support under ECCS1653100 and ECCS1809917 awarded by the National Science Foundation. The Government has certain rights in the invention.

BACKGROUND

As is known in the art, complementary metal-oxide semiconductor (CMOS) integrated circuits (ICs or "chips") exist which operate in the millimeter wave and terahertz frequency ranges (30 GHz-3000 GHz). This is approximately 10 to 1000 times higher than the frequency ranges in which current wireless systems operate (e.g. systems operating in accordance with current 5G/4G and Wi-Fi standards). These increased operational frequency ranges present challenges associated with interfacing CMOS chips with peripheral circuits. Conventional interconnection technologies such as wire-bonding techniques and ball grid arrays (BGAs) have been used to couple RF signals between CMOS chips with peripheral circuits. In the millimeter wave and terahertz frequency ranges band, however, such interconnection techniques typically result in the existence of parasitic inductances and capacitances that may result in signal loss due to the dissipation and reflection of signals. Rectangular waveguides have been widely adopted as a transmission line that can be used in the millimeter wave and terahertz frequency ranges. There remain, however difficulties coupling signals between circuitry on CMOS chips and rectangular waveguides.

SUMMARY

While radiation based integrated circuit to waveguide transition structures (also referred to as chip-to-waveguide transition structures) are generally known, in accordance with the concepts, system, circuits, devices and techniques described herein, it has been recognized that radiation based chip-to-waveguide transition structures generally require dielectric resonators to assist is transferring or transmitting the radiation from a chip to waveguide. It has also been recognized that these approaches can result in a so-called front-side-radiation based technique that does not require wire-bonding, and that is highly efficient (i.e. is low loss) and does not require wafer thinning.

It has also been recognized that there is a need for chip-to-waveguide transition structures that use dielectric resonators, and which limit the use of on-chip pads which can block the dielectric resonator and which have sample-to-sample variations and costs which are relatively low compared with sample-to-sample variations and cost of conventional interconnect circuits, devices and techniques.

Described herein is a slot-array chip-to-waveguide coupler (or more simply, a "slot-array coupler") that uses "backside" radiation. This slot array coupler permits on-chip signals to radiate into a waveguide through the backside (i.e. that uses a surface of the IC which is opposite a surface of the IC on which IC circuitry is disposed) of an integrated circuit (also referred to as an "IC" or a "chip"). In some embodiments, the integrated circuit may be provided as a complementary metal-oxide semiconductor (CMOS) IC having a silicon substrate.

The slot array coupler described herein enable on-chip, direct backside radiation into a waveguide. Additionally, the slot array coupler described herein has the advantages of not requiring wafer thinning, a dielectric resonator, an E-plane probe, or wire-bonding for high frequency signal interconnection. This results in a chip-to-waveguide transition structure which is simple with a simple assembly requirement which reduces (and ideally minimizes) inter-chip variation (i.e. IC performance variations which may result from either the process of manufacturing the slot array coupler portion of an IC or the process of mounting or otherwise disposing the sot the slot array coupler and IC on a waveguide.

The slot array coupler described herein substantially confines (and ideally, completely confines) the RF signal or wave within the IC substrate (e.g. within a silicon substrate of a CMOS chip). Since the RF field is confined within the substrate, slot array couplers provided in accordance with the concepts and architectures described herein are less sensitive to (and ideally completely insensitive to) external environmental factors such as variations in the micro-assembly of periphery electronics, fabrication tolerances, and the disturbance of an external electrical or magnetic field. This provides the additional advantage of a design suitable for mass production.

Additional advantages provided by the concepts, systems, circuits, devices and techniques described herein include mode matching between slot array coupler radiation patterns and dominant waveguide modes (e.g. the TE10 mode in rectangular waveguide) which is improved relative to prior art approaches and a coupling efficiency which is relatively high compared with prior art approaches. In some embodiments, a coupling loss of about 5.3 dB can be achieved. In some embodiments, a coupling efficiency of the slot array coupler described herein may be enhanced by a silicon-on-insulator (SOI) process used to manufacture the coupler.

The system also has a wide operational frequency bandwidth of approximately 20% (i.e. a 3 dB transmit-receive (TRX) RF output power bandwidth) due to the use of non-resonate type coupling between the slot array coupler and the waveguide. Also, the slot array coupler results in a substrate mode rejection characteristic and a transmit-receive (TRX) isolation characteristic which is comparable to or higher than those achieved by prior art approaches IC-to-waveguide couplers in the frequency ranges of interest for a molecular clock. Such substrate mode rejection and TRX isolation characteristics are achieved through confinement of a propagating RF signal in the vertical direction (i.e. confinement of a propagating RF signal between frontside and backside surfaces of the chip. There is no limitation on the chip size. Furthermore "pads" (i.e. regions of conductive material) on the front side of the chip are accessible.

In one embodiment, described is a slot array coupler comprising a silicon substrate having first and second opposing surfaces (also sometimes referred to as frontside and backside surfaces) and one or more double slot radiators disposed on the substrate and configured for bi-directional propagation of RF signals provided thereto (i.e. the double slot radiators may operate to transmit or receive an RF signal), a slot balun disposed on the substrate and configured to provide impedance matching and isolate an RF signal, and a grounded coplanar waveguide transmission line disposed on the substrate and configured to propagate the RF signal in a horizontal direction.

The double slot radiators can be disposed at opposite ends of a signal path (e.g. at opposite ends of a feed line), and the one or more double slot radiators are configured to receive RF signals from and provide RF signals to a waveguide. In some embodiments, the waveguide can be a rectangular waveguide. The one or more double slot radiators can receive RF signals via a backside of the silicon substrate. The grounded coplanar waveguide can receive an RF signal from a transmitter circuit over a signal path (e.g. a hardwired connection coupled between the coplanar waveguide transmission line and a transmitter circuit). RF signals can propagate through the coplanar waveguide transmission line and across a channel formed within the slot balun to the double slot radiators.

Also described is a system for propagating an RF signal that includes a first coupler in communication with a first waveguide, wherein the first coupler is configured to receive an RF signal propagating through the first waveguide. The system also includes a receiver electrically connected to the first coupler wherein the receiver receives the RF signal from the first coupler. The system also includes a transmitter electrically coupled to the receiver and that transmits the RF signal to a second coupler electrically coupled to the transmitter. Also included is a second coupler in communication with a second waveguide and configured to receive the RF signal and provide the RF signal through the second waveguide.

BRIEF DESCRIPTION OF THE DRAWINGS

The foregoing and other objects, features and advantages of the concepts described herein will be apparent from the following more particular description of the embodiments and the appended claims, as illustrated in the accompanying drawings in which like reference characters refer to the same parts throughout the detailed description. It should be noted that the drawings are not necessarily to scale, or inclusive of all elements of a system, emphasis instead generally being placed upon illustrating the concepts, structures, and techniques sought to be protected herein. Reference characters introduced in a figure may be repeated in one or more subsequent figures without additional description in the detailed description in order to provide context for other features of the described embodiments.

DETAILED DESCRIPTION

Figure 1A:
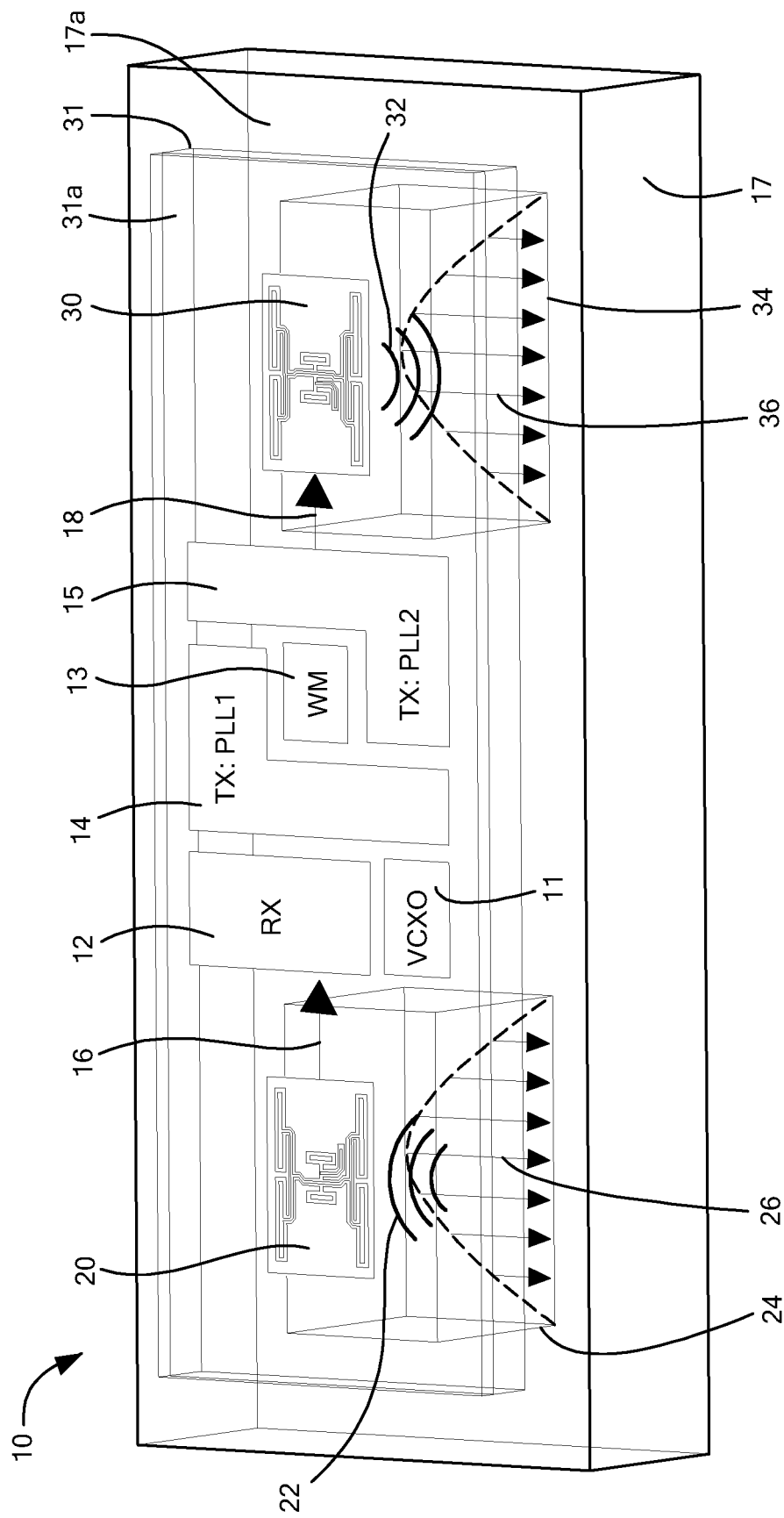
FIG. 1A is a block diagram of an integrated circuit ("IC" or "chip") disposed over and coupled to rectangular waveguides via first and second slot array couplers (SACs), according to some embodiments.

Described herein is a slot array coupler circuit ("slot array coupler" or "SAC") for coupling radio frequency (RF) signals between an integrated circuit (also sometimes referred to herein as an "IC" or a "chip") and a waveguide. Reference is sometimes made herein to embodiments in which the IC is provided as a complementary metal-oxide semiconductor (CMOS) IC having a silicon substrate (i.e. a silicon CMOS chip) and the waveguide is provided as a rectangular waveguide and which are part of a molecular clock. Such references are made only for purposes of promoting clarity and understanding in the text and are not intended as limiting and should not be construed as such.

Various embodiments of the concepts, systems, circuits, devices and techniques are described herein with reference to the related drawings. Alternative embodiments can be devised without departing from the scope of the described concepts and illustrative systems, circuits, devices and techniques. It is noted that various connections and positional relationships (e.g., over, below, adjacent, etc.) are set forth between elements in the following description and in the drawings. These connections and/or positional relationships, unless specified otherwise, can be direct or indirect, and the concepts and illustrative systems, circuits, devices and techniques are not intended to be limiting in this respect. Accordingly, a coupling of entities can refer to either a direct or an indirect coupling, and a positional relationship between entities can be a direct or indirect positional relationship. As an example of an indirect positional relationship, references in the present description to element or structure "A" over element or structure "B" include situations in which one or more intermediate elements or structures (e.g., element "C") is between element "A" and element "B" regardless of whether the characteristics and functionalities of element "A" and element "B" are substantially changed by the intermediate element(s).

The following definitions and abbreviations are to be used for the interpretation of the claims and the specification.

As used herein, the terms "comprises," "comprising," "includes," "including," "has," "having," "contains" or "containing," or any other variation thereof, are intended to cover a non-exclusive inclusion. For example, a method, article, or apparatus that comprises a list of elements is not necessarily limited to only those elements but can include other elements not expressly listed or inherent to such method, article, or apparatus.

The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment," "an embodiment," "an example embodiment," or variants of such phrases indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection knowledge of one skilled in the art to affect such feature, structure, or characteristic in connection with other embodiments whether or not explicitly described.

Furthermore, it should be appreciated that relative, directional or reference terms (e.g. such as "above," "below," "left," "right," "top," "bottom," "vertical," "horizontal," "front," "back," "rearward," "forward," etc.) and derivatives thereof are used only to promote clarity in the description of the figures. Such terms are not intended as, and should not be construed as, limiting. Such terms may simply be used to facilitate discussion of the drawings and may be used, where applicable, to promote clarity of description when dealing with relative relationships, particularly with respect to the illustrated embodiments. Such terms are not, however, intended to imply absolute relationships, positions, and/or orientations. For example, with respect to an object or structure, an "upper" surface can become a "lower" surface simply by turning the object over. Nevertheless, it is still the same surface and the object remains the same. Also, as used herein, "and/or" means "and" or "or", as well as "and" and "or." Moreover, all patent and non-patent literature cited herein is hereby incorporated by references in their entirety.

The terms "disposed over," "overlying," "atop," "on top," "positioned on" or "positioned atop" mean that a first element, such as a first structure, is present on a second element, such as a second structure, where intervening elements or structures (such as an interface structure) may or may not be present between the first element and the second element. The term "direct contact" means that a first element, such as a first structure, and a second element, such as a second structure, are connected without any intermediary elements or structures between the interface of the two elements.

Molecular clocks that are referenced to sub-THz rotational transitions of a gaseous molecule, such as carbonyl sulfide (OCS) gas, are a highly stable alternative to known chip-scale atomic clocks. As disclosed herein, molecular clocks can use an IC, such as a CMOS chip, coupled to a waveguide gas cell via one or more SACs. This architecture is one that can be miniaturized and manufactured at a cost less than the cost of manufacturing known chip-scale atomic clocks.

In some instances, known chip-scale molecular clocks (CSMC) can exhibit long-term stability (e.g., $3.8 \times 10^{-10} @ \tau = 10^3$ s), but be limited by non-idealities of the carbonyl sulfide gas transition curve which is susceptible to environmental disturbance.

The molecular clocks described herein (e.g., a 70 mW CSMC chip) can be designed to enable high-order, dispersion-curve locking that can enhance the long-term stability of the molecular clocks described herein by a multiple of nine (9) or more. Thus, the molecular clocks described herein can also possess enhanced temperature stability in relation to oven-controlled crystal/MEMS oscillators (OCXO/OCMO) and enhanced magnetic sensitivity in relation to chip-scale atomic clocks (CSAC).

Figure 1B:
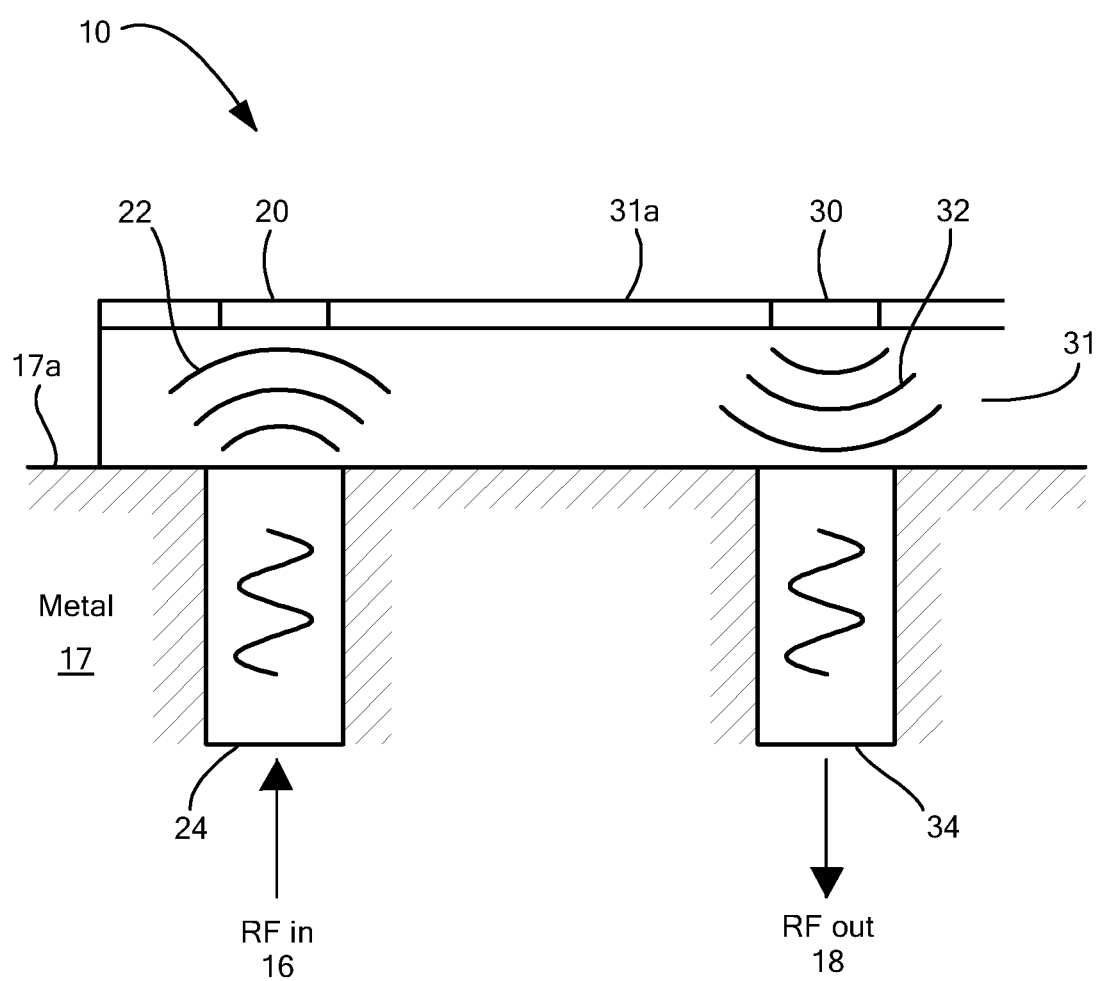
FIG. 1B is a side view demonstrating a radio frequency (RF) signal propagating through the rectangular waveguides and IC of FIG. 2A.

Illustrated in FIGS. 1A and 1B is an embodiment of the molecular clock 10 that includes a CMOS chip 31, two SACs 20, 30 disposed over respective ones of waveguide 24, 34 apertures, and circuitry used to process RF signals transmitted/received between waveguides 24, 34. In some instances, waveguides 24, 34 can have similar dimensions and geometric configurations. In one embodiment, waveguides 24, 34 may be provided as WR 4.3 rectangular waveguides (generally suitable for transmission of RF signals in the 170 GHz-260 GHz frequency range) with apertures having an area that is approximately 1.09 mm$^2 \times 0.55$ mm$^2$. Waveguides 24, 34 may be coupled to, or may form a part of, a gas cell containing gaseous molecules, such as carbonyl sulfide (OCS). In some embodiments, CMOS chip 31 may be disposed over, or within, a metal structure 17. For example, as shown in FIGS. 1A and 1B, CMOS chip 31 can be disposed over a top surface 17a of metal structure 17. The metal structure 17 can serve two purposes. First, waveguides 24, 34 can be formed within metal structure 17 and extended out therefrom as illustrated in FIG. 1B, thus providing a chip-to-waveguide interface. Second, metal structure 17 can support the chip 31 mechanically.

Circuitry of molecular clock 10 can be disposed or otherwise provided or fabricated on a surface 31a of CMOS chip 31. In some embodiments, CMOS chip 31 may be provided as a silicon chip and, in some instances, can include an un-thinned silicon substrate. CMOS chip 31 can have a thickness of approximately 305 μm and can be manufactured, for example, using a 65 nm bulk CMOS process that uses a DC power consumption of about 70 mW. In other embodiments, CMOS chip 31 can include a silicon substrate having a thickness of about 12 mil.

As will be discussed in detail below, CMOS chip 31 can include one or more antenna arrays configured to radiate RF signals using back-chip radiation to couple RF signals between the chip 31 and respective ones of waveguides 24, 34. In this configuration, the one or more antenna arrays can be configured so as mimic the E-field distribution of the corresponding waveguides 24, 34. That is, the radiators together with the SAC circuitry described herein are configured to form an electric field configuration similar to an electric field configuration which would exist in the aperture of the waveguide for signals propagating in the dominant waveguide mode. Thus, in the embodiment of FIGS. 1A and 1B which includes rectangular waveguides 24, 34, then the radiators and SAC circuitry can be configured to form an electric field configuration that is the same as or similar to that which would exist in the aperture of rectangular waveguides 24, 34 (e.g., a TE10 electric field configuration or mode). By mimicking the E-field distribution, the antenna array(s) can provide strong coupling and wide bandwidth between SACs 20, 30 and waveguides 24, 34. If, for example, the CMOS ship 31 interfaced with a circular waveguide, then the radiators and SAC circuitry can be configured to form an electric field configuration similar to a dominant mode electric field configuration which would exist in the aperture of a circular waveguide (e.g. a TE11 electric field configuration or mode).

In some embodiments, a signal isolation characteristic between transmitter signals (i.e. signals propagating in a transmit signal path) and receiver signals (i.e. signals propagating in a receive signal path) can be better than 60 dB at the center frequency. Since a silicon substrate has a relative dielectric constant typically of about 11.7 (and generally in the range of 8 to 15), the majority of the RF energy coupled between the CMOS chip 31 and waveguides 24, 34 via the respective SACs 20, 30 is confined within the substrate. This can make SACs 20, 30 substantially insensitive to external environmental factors. For example, SACs 20, 30 can be insensitive to environmental factors such that the induced change of transmission coefficient is less than 1 dB.

In the embodiment of FIGS. 1A and 1B, a first SAC 20 can receive an RF signal 22 from a first waveguide 24, where the RF signal 22 has an associated electric field 26 that conforms in part to the geometry of first waveguide 24. Upon receiving the RF signal 22, the first SAC 20 processes RF signal 22 and outputs a receive signal 16 to circuitry installed on CMOS chip 31. This circuitry can include a receiver 12 which can be any receiver discussed herein. Receiver 12 can process receive signal 16 in conjunction with input from a VCXO 11 according to the previously discussed methods. A transmit signal 18 can be generated using one or more phase locked loops (PLLs) 14, 15 and a wavelength modulator 13 of a transmitter. The generated transmit signal 18 is coupled to a second SAC 30 disposed over a second waveguide 34 aperture. The second SAC 30 permits the transmit signal 18 to radiate through second waveguide 34 as RF signal 32 having an associated electric field 36.

In some instances, the first SAC 20 can be referred to as the RX SAC 20 which identifies it as the coupler used in conjunction with the receiver circuitry. Likewise, the second SAC 30 can be referred to as the TX SAC 20 which identifies it as the coupler used in conjunction with the transmitter circuitry. As previously mentioned, waveguides 24, 34 may be coupled to, or may form a part of, a gas cell containing gaseous molecule. Thus, receive signal 16 may be responsive to transmit signal 18 interacting with the gaseous molecule.

Illustrated in FIGS. 2A-2E is an embodiment of a molecular clock 10 that demonstrates an CSMC architecture comprising one or more SACs 20, 30 disposed over respective ones of waveguide 24, 34 apertures. The waveguides 24, 34 may be coupled to, or may form a part of, a gas cell 21 containing gaseous molecules, such as carbonyl sulfide (OCS). In some embodiments, molecular clock 10 can be configured similarly to or have characteristics of the molecular clock embodiments described in U.S. Pat. No. 10,739, 728, filed on Dec. 27, 2018 and entitled "Molecular Clock," the contents of which are hereby incorporated by reference in their entirety. In some embodiments, waveguides 24, 34 may be provided as WR4.3 rectangular waveguides (e.g., TE10 mode).

Molecular clock 10 can include a spectroscopy transmitter 5 comprised of a first phase locked loop (PLL) 14, a second phase locked loop (PLL) 15, a frequency quadrupler 9, and a wavelength modulator 13. In some instances, the first PLL 14 and the second PLL 15 can be cascaded together. In other instances, the one of the PLLs 14, 15 can operate at approximately 3.21 GHz Σ-Δ, while the other PLL 14, 15 can operate at approximately 57.77 GHz integer-N. Molecular clock 10 can also include a spectroscopy receiver 12 having a subthreshold MOSFET square-law detector 12a, a variable gain amplifier (VGA) 12b, and a lock-in detector 12c. In some embodiments, lock-in detector 12c can be provided as a harmonic-rejection lock-in detector (HRLKD).

Transmitter 5 can be referenced to an on-chip voltage-controlled crystal oscillator (VCXO) 11 with an off-chip quartz crystal (XTAL). In some instances, VCXO 11 can operate at approximately 60 MHz. In other instances, VCXO 11 can operate at a frequency, $f_{XO}$, within a range of 10 kHz to approximately 80 MHz.

Transmitter 5 can generate a wavelength modulated transmit signal (or "probing signal") 18 having a probing frequency $f_p(t)$ 33 selected to approximately match the frequency, $f_0$, of a rotational spectral line of OCS or another gas molecule contained within gas cell 21. Transmit signal 18 can be propagated through waveguide 34 to probe the transition line of gaseous molecules within gas cell 21. In some embodiments, where the gaseous molecules comprise OCS, $f_0$ can be approximately 231.06 GHz. In some embodiments, $f_0$ can be in a range of 200-260 GHz. In some embodiments, transmit signal 18 can have an average frequency of $f_{p0}$ which can be wavelength modulated by modulator 13. In some embodiments, transmitter 5 can wavelength modulate the transmit signal 18 using a modulation frequency, $f_m$, of approximately one hundred kHz or any frequency less than one MHz.

Figure 2A:
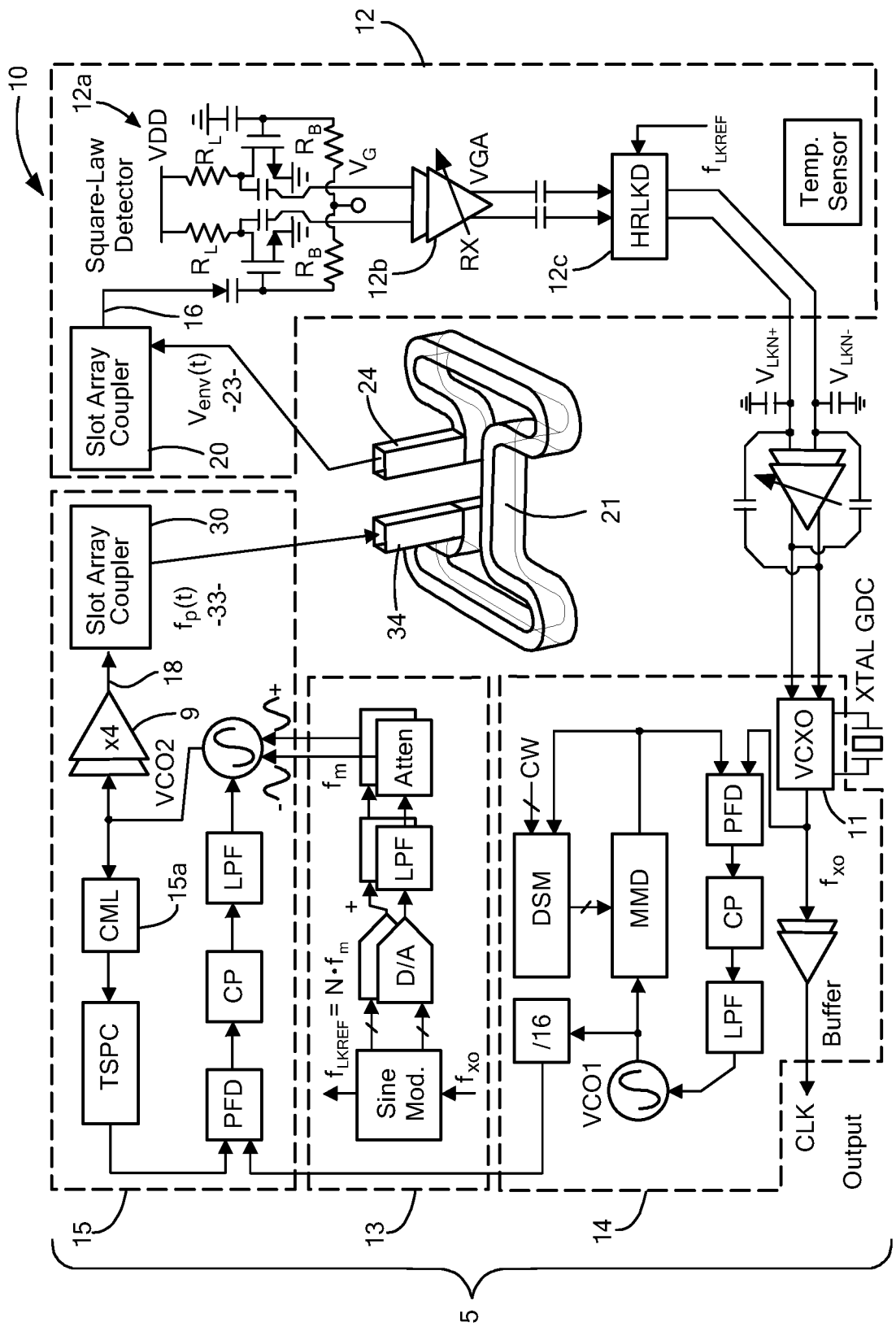
FIG. 2A is a partial schematic view of a molecular clock that uses a pair SACs to couple radio frequency (RF) signals between an IC and a waveguide, according to some embodiments.
Figure 2C:
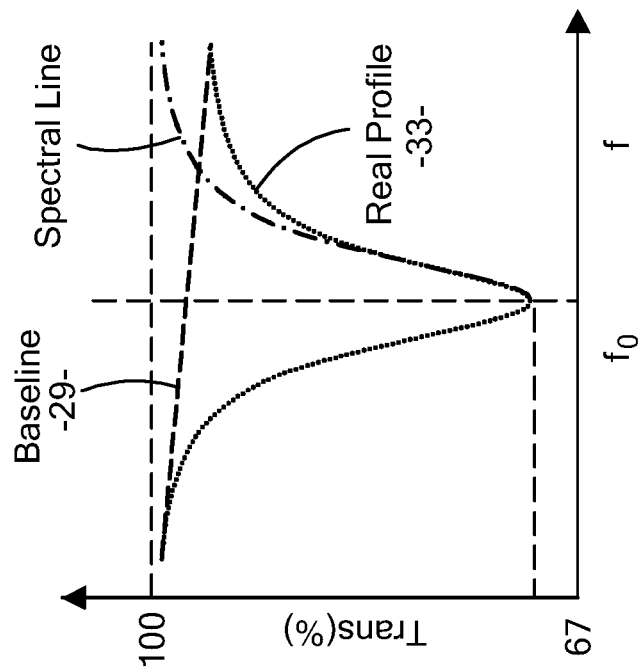
FIG. 2C shows a fundamental dispersion curve that may be produced with the molecular clock of FIG. 2A.
Figure 2B:
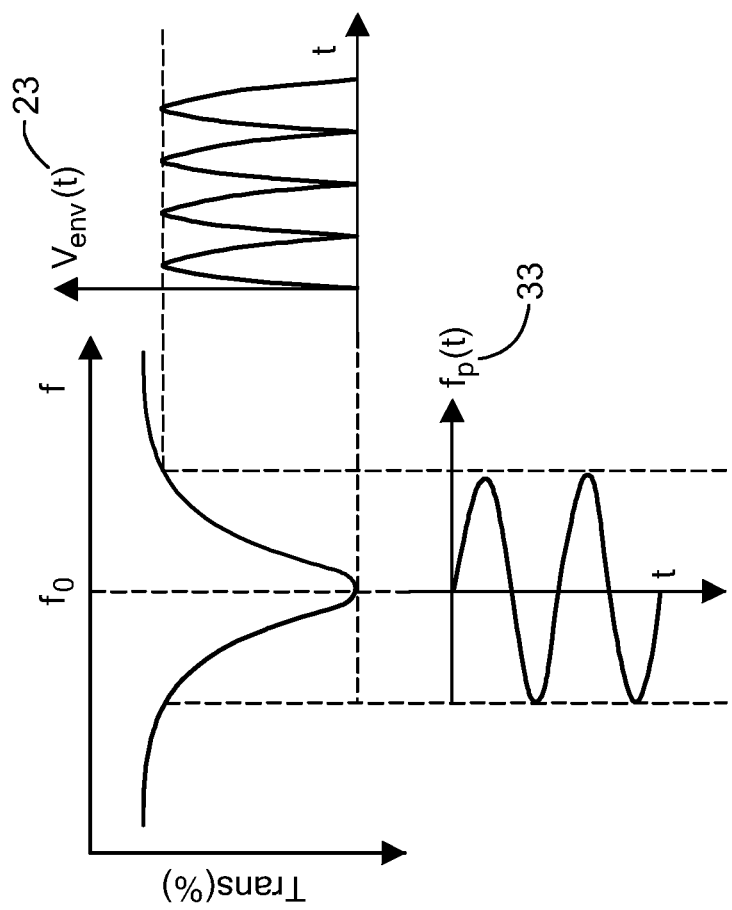
FIG. 2B is a plot illustrating an envelope of a modulated probing signal interacting with gaseous molecules within the molecular clock of FIG. 2A.
Figure 2E:
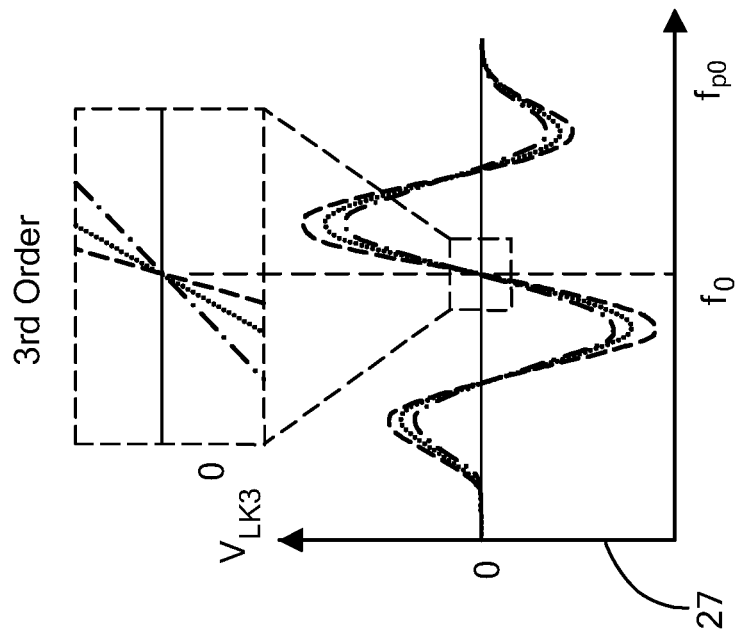
FIG. 2E shows a third-order dispersion curve that may be produced with the molecular clock of FIG. 2A.
Figure 2D:
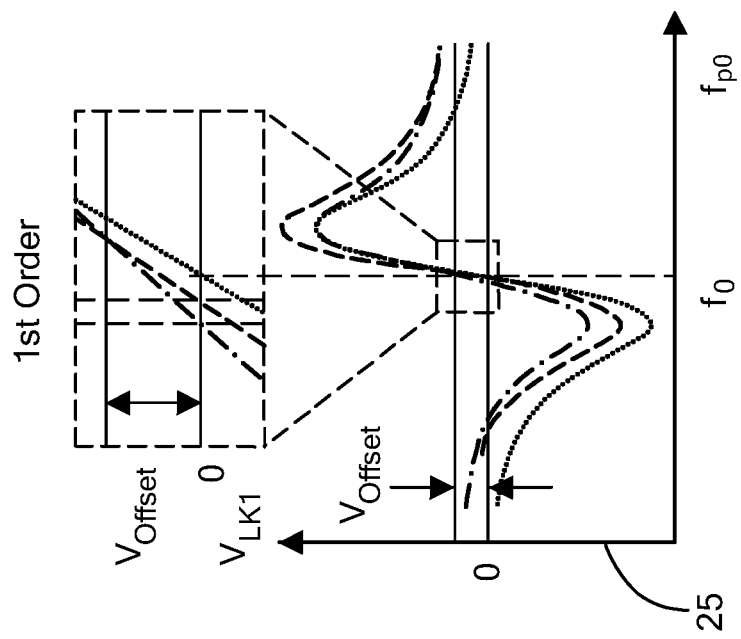
FIG. 2D shows a first-order dispersion curve that may be produced with the molecular clock of FIG. 2A.

In some embodiments, while sweeping the transition line of the gaseous molecules at probing frequency, $f_p(t)$ 33, gas absorption can introduce an envelope fluctuation $V_{env}(t)$ 23 with period of one over the modulation frequency ($1/f_m$). The $N^{th}$ order odd harmonics can be denoted as $V_{LK,N}$ where "N" stands for the order of the harmonic and "LK" for lock-in, meaning that molecular clock 10 has locked into that particular harmonic. FIG. 2D shows a first-order dispersion curve 25 demonstrating an offset voltage, $V_{Offset}$, generated when molecular clock 10 locks onto the first-order harmonic, $V_{LK1}$. By comparison, FIG. 2E shows a third-order dispersion curve 27 demonstrating a relative lack of offset voltage, $V_{Offset}$, generated when molecular clock 10 locks onto the third-order harmonic, $V_{LK3}$.

For a symmetric gaseous molecule line profile, the following can be true about a $N^{th}$ order odd harmonic: $V_{LK,N}=0$ at $f_{p0}=f_0$. As illustrated in FIG. 2A, the transmitter 5 and receiver 12 are arranged in a negative feedback loop such the offset voltage observed for a particular harmonic (e.g., $V_{LK3}$) can be used to dynamically adjust the frequency $f_{XO}$ of VCXO 11 to provide stable clock. As shown in FIG. 2C, the gas-free transmission baseline 29 of molecular clock 10 may not be level because of the standing-wave inside the gas cell and the non-flat transmitter-receiver frequency response. The offset voltage, $V_{Offset}$, that appears on the first-order dispersion curve 25 ($V_{LK1}$ as a function of $f_{p0}$), appears because the first-order dispersion curve 25 is a representation of the first-order derivative of the asymmetric gaseous molecule line profile. Thus, as the gas absorption changes with temperature, the zero-crossing point of the dispersion curve at $f_{p0}$ is equal to $f_0$—therefore $f_{XO}$ drifts.

The $f_{XO}$ drift and $V_{Offset}$ demonstrated by first-order dispersion curve 25 (FIG. 2D) may result in part from instability associated with using a low-order dispersion curve. In some instances, stability can be enhanced by using a higher-order dispersion curve such as a third-, fifth-, or seventh-order dispersion curve (i.e., N=3, 5, 7 and so on). In these higher-order dispersion curves, the tilting of the baseline 29 becomes negligible. To lock onto such higher-order dispersion curves, it may be a requirement that molecular clock 10 uses continuous sinusoidal wavelength modulation (WM) with high accuracy.

Figure 3:
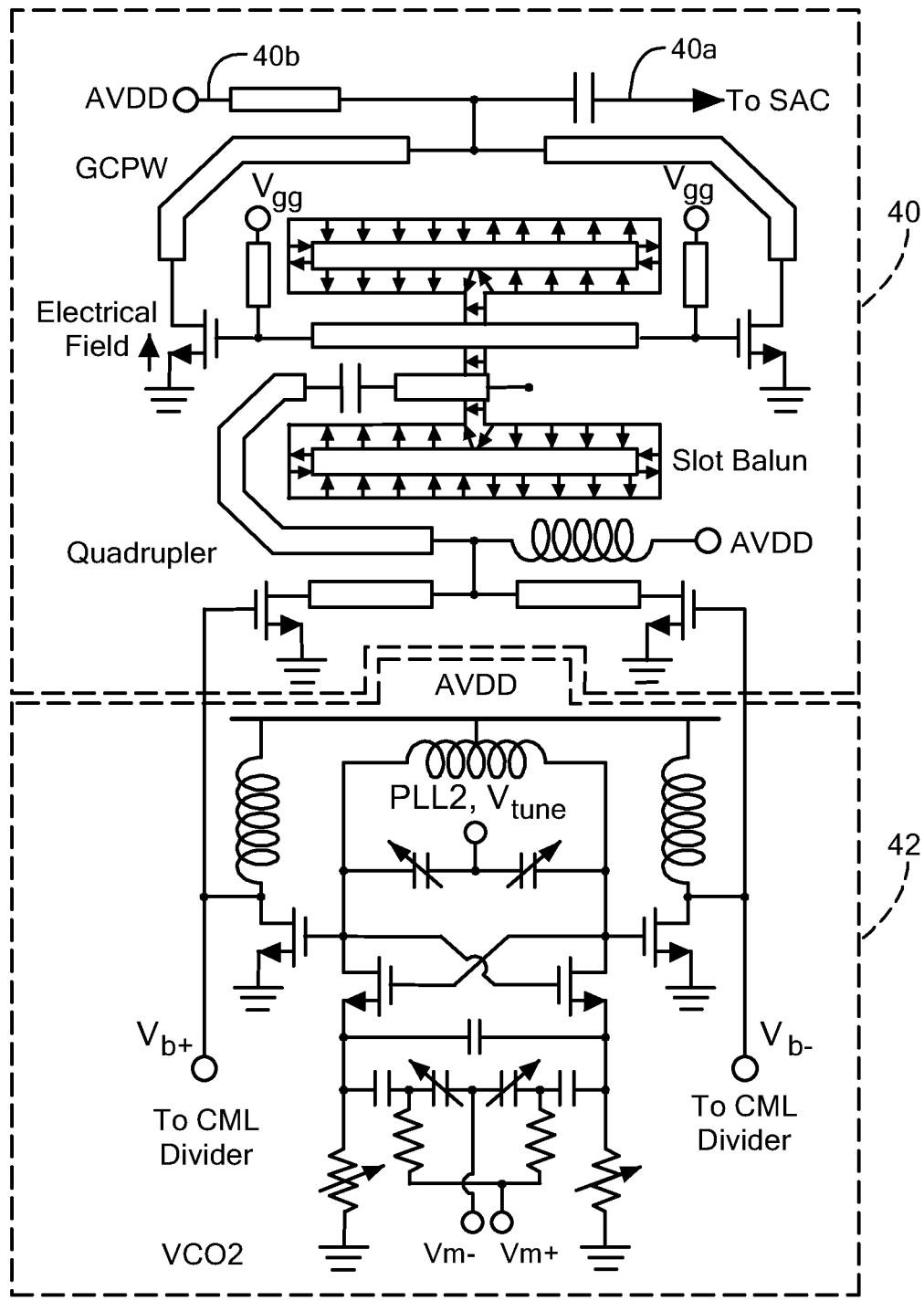
FIG. 3 is schematic diagram of circuitry that can be provided within a transmitter portion of a molecular clock transmitter, according to some embodiments.

Turning to FIG. 3, and with continued reference to FIG. 2A, to address the requirement that the molecular clock 10 uses continuous sinusoidal WM with high accuracy, in some instances a 57.77 GHz voltage-controlled oscillator (VCO) 42 can be used in the second PLL 15. The illustrative VCO 42 can be chirped by a high-accuracy, differential sine signal at $f_m$=100 kHz, which can be generated by a pair of 8-bit digital-to-analog converters (DACs) and then fed to a pair of small varactors in the VCO 42 as illustrated in FIG. 3. The DACs (not shown in FIG. 3) can be connected to terminals $V_m$+, $V_m$−. Terminals $V_b$+, $V_b$− are the VCO buffer outputs and can be connected to a current mode logic divider (CML), such as CML 15a in FIG. 2A.

Also shown in FIG. 3 is an illustrative frequency quadrupler 40 configured to multiply the VCO output frequency by a factor of four (4) then sends the signal to a SAC at output node 40a. That is, output node 40a can be connected to a port of a SAC. For example, referring ahead to FIGS. 6A and 6B, output node 40a can be connected to a GCPW (Port 2) 60 of a SAC. Quadrupler 40 can be connected to an analog supply voltage source (AVDD) at a node 40b. Quadrupler 40 further includes gate bias voltage terminals $V_{gg}$ which can be DAC (not shown) for voltage control.

In some instances, an ultra-small frequency deviation (e.g., $\Delta f \approx 2$ MHz or $9 \times 10^{-6}$ of 231.06 GHz) may be required for optimal line probing, additionally resistive source degeneration may be adopted to reduce the VCO 42 sensitivity. The wavelength modulator 13 can include a three-bit attenuator and a ten-bit phase shifter that may be used for fine tuning. The loop bandwidth (~10 kHz) of the 57.77 GHz VCO 42 can be designed to be much smaller than $f_m$=100 kHz to prevent disturbing wavelength modulator 13 of transmitter 5.

Turning back to FIG. 2A, using cascading PLLs 14, 15 can provide better modulation accuracy and less phase noise. Further, quadrupler 9 can include a 115.5 GHz slot balun that can be used to multiply the VCO 42 output to 231.06 GHz. In some embodiments, molecular clock 10 can be locked to a third-order harmonic (i.e., a third-order dispersion curve can be used). In these embodiments, the receiver lock-in detector 12c can be referenced to $f_{LKREF}=3f_m$. Lock-in detector 12c can be passive and present a greater than 80 dB harmonic rejection ratio and less than 10 pV DC offset voltage at its differential output.

During operation of molecular clock 10, the peak output power of one of the PLLs 14, 15 (e.g., the PM231 GHz PLL) can be measured by a power meter (e.g., a PM5 power meter). This peak output power can be approximately −9.4 dBm (−4.2 dBm excluding the SAC loss) approaching the gas cell saturation threshold. In some instances, noise within the transmitter 5 or one of the PLLs 14, 15 of transmitter 5 can lead to PM-to-AM noise conversion in molecular clock 10 and thereby lowering the stability of the clock 10. For example, at 231.06 GHz, the measured phase noise of the unmodulated transmitter 5 (including the on-chip VCXO 11) output may be approximately 60.7 dBc/Hz@100 kHz offset and −81.5 dBc/Hz@1 MHz offset, respectively. By way of a further example, the measured noise equivalent power (NEP) of the receiver 12 may be 62.8 pW/Hz$^{0.5}$ (19.0 pW/Hz$^{0.5}$ excluding the SAC loss) at 100 kHz baseband frequency. In these examples, when probing the gaseous molecule transition, the measured third-order dispersion curve 27 (FIG. 2E) exhibits a smaller $V_{Offset}$ (e.g., $V_{Offset}$=4.3 pV) than that of the first-order dispersion curve 25 (FIG. 2D) (e.g., $V_{Offset}$=1.1 mV). When molecular clock 10 is locked to a third-order harmonic (e.g., $SNR_{1\ Hz}$=65.7 dB) and the clock 10 is a 0.09 Hz clock open-loop unity-gain bandwidth, the measured Allan Deviation (ADEV) can be $3.2 \times 10^{-1}$ 1 s and $4.3 \times 10^{-11}$@$\tau=10^3$ s, respectively. This performance bridges the performance gap between molecular clocks and CSAC. Furthermore, the measured magnetic sensitivity of the unshielded clock, being 0.4 ppb at 75 Gauss or $\pm 2.9 \times 10^{-12}$/Gauss, can be thirty-one times better than that of the CSAC with magnetic shielding. Using an on-chip temperature sensor and second-order polynomial compensation, the frequency drift achieves $\pm 3.0 \times 10^{-9}$ over temperature range of 27~65° C. The above examples demonstrate that molecular clock 10 described herein has better temperature stability and power performance at a smaller size and lower cost than known systems.

Figure 4A:
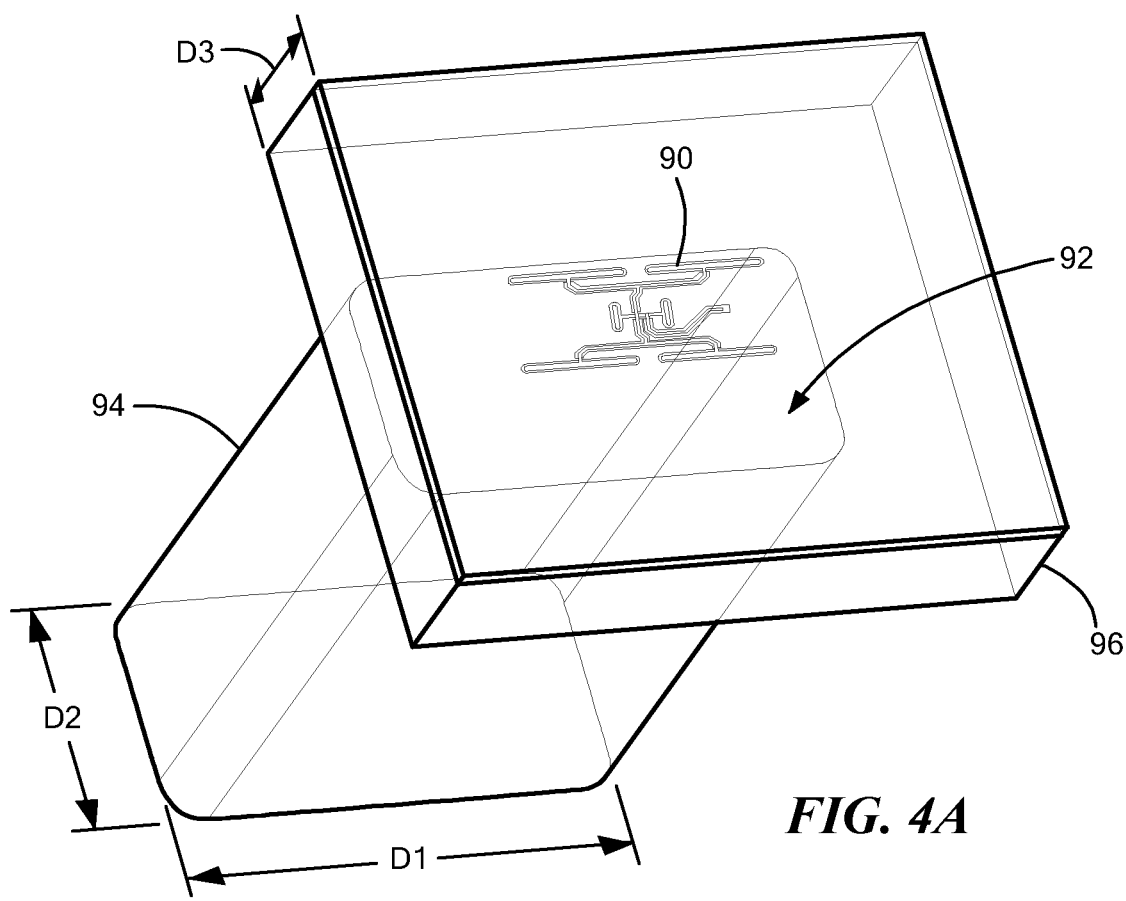
FIGS. 4A and 4B are isometric views of a SAC disposed over an aperture of a waveguide, according to some embodiments.
Figure 4B:
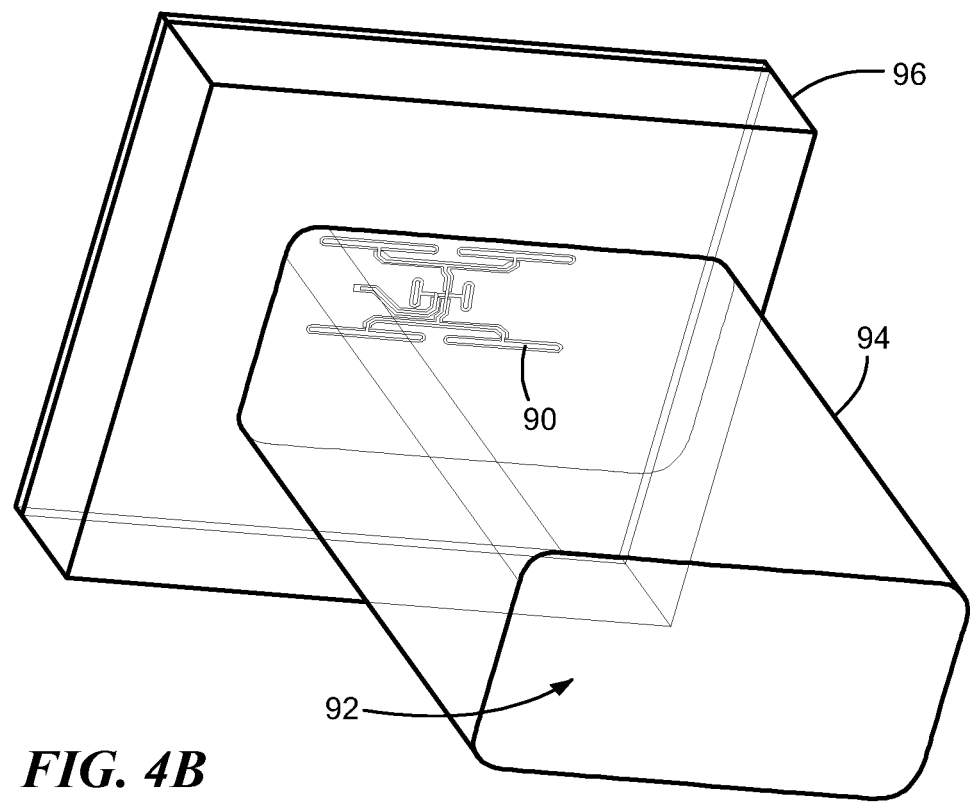

FIGS. 4A and 4B illustrate a SAC 90 disposed over an aperture 92 of a waveguide 94. In some embodiments, aperture 92 can have a length D1 of approximately 1.09 mm and a width length D2 of approximately 0.55 mm. SAC 90 may be formed on a surface of a CMOS chip 96. In some embodiments, CMOS chip 96 can have a thickness D3 selected based on an operational frequency of a device/system in which the illustrated structure is employed. For example, for 231 GHz operation, a wafer thickness of 12 mil (305 um) can be used. As shown in FIGS. 4A and 4B, waveguide 94 can be a rectangular waveguide having four sides and two pairs of parallel sides, where one pair of parallel sides is orthogonal to the other pair of parallel sides. SAC 90 can be disposed over the aperture 92 such that one pair of parallel sides of SAC 90 are equidistant from a corresponding pair of parallel sides, and the other pair of parallel sides of SAC 90 are equidistant from the second pair of parallel sides of the waveguide aperture 92. Further details of the SAC positioning are provided below in the context of FIG. 6B.

Figure 5:
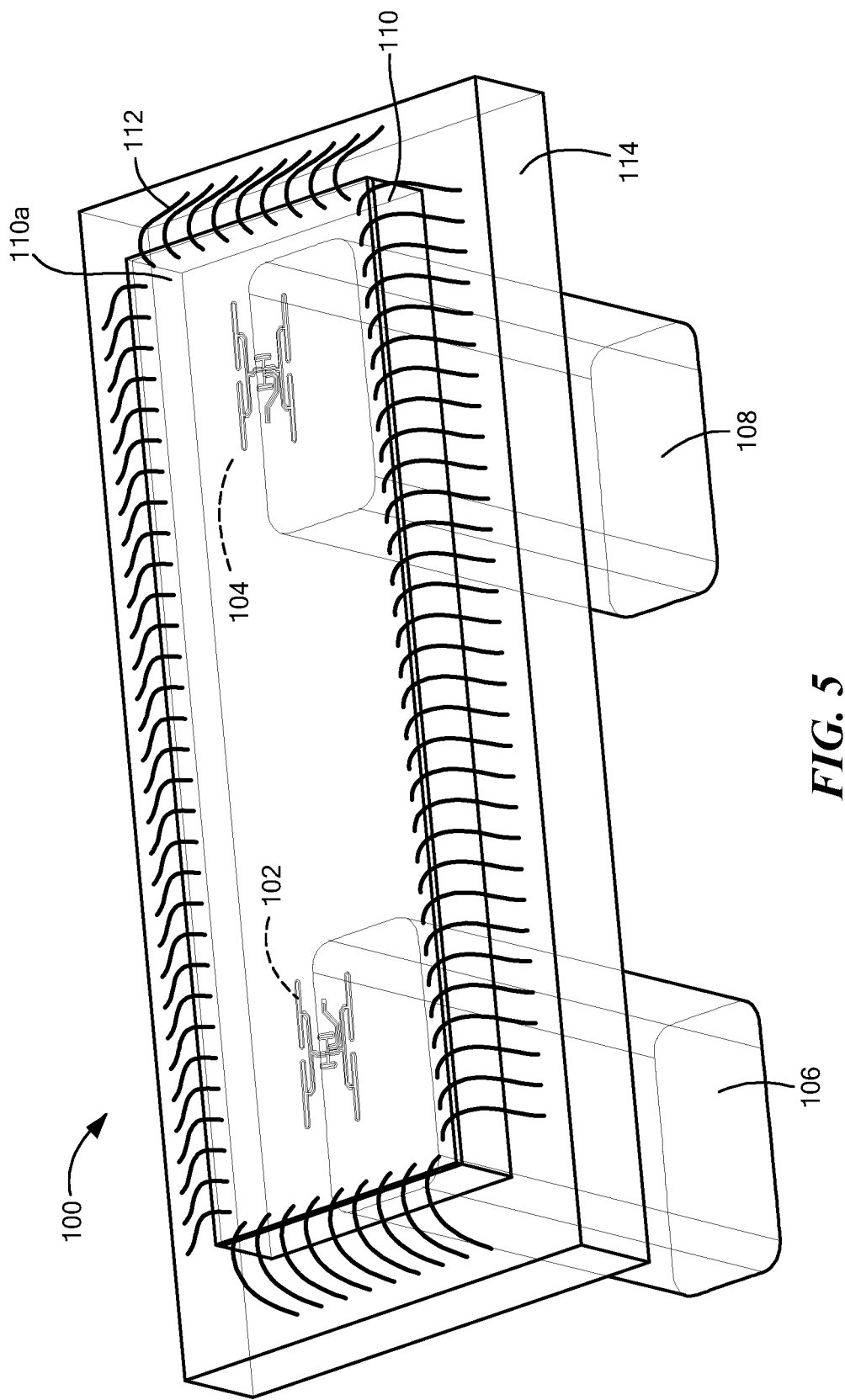
FIG. 5 is an isometric view of an integrated circuit (IC) having a pair of SACs disposed over respective ones of a pair of waveguides, according to some embodiments.

FIG. 5 shows an integrated circuit (IC) 100 having a pair of SACs 102, 104 disposed over respective ones of a pair of waveguides 106, 108, according to some embodiments. SACs 102, 104 may be formed or otherwise disposed on a surface 110a of a CMOS chip 110, and CMOS chip 110 can be wire bonded 112 to a metal structure 114, as shown. Both SACs 102, 104 can be disposed on the CMOS chip 110 such that the SACs 102, 104 are integrated into a single CMOS chip 110. Additionally, the single CMOS chip 110 is disposed over the apertures for both waveguides 106, 108 such that the SACs 102, 104 are arranged in the center of each waveguide aperture. By arranging the SACs 102, 104 in this manner, substrate mode is suppressed, and there is high isolation and less sensitivity to chip size.

The illustrative IC 100 may be used, for example, within molecular clock 10 of FIG. 1A. That is, SACs 102, 104 of FIG. 5 may be the same as or similar to SACs 20, 30 of FIG. 1A, and waveguides 106, 108 of FIG. 5 may be the same as or similar to waveguides 24, 34 of FIG. 1A. In the disclosed arrangement, SACs 102,104 can provide low loss connection between the CMOS chip 110 and a waveguide gas cell (e.g., gas cell 21 of FIG. 2A) so as to boost the spectroscopic signal-to-noise ratio of molecular clock 10.

Figure 6A:
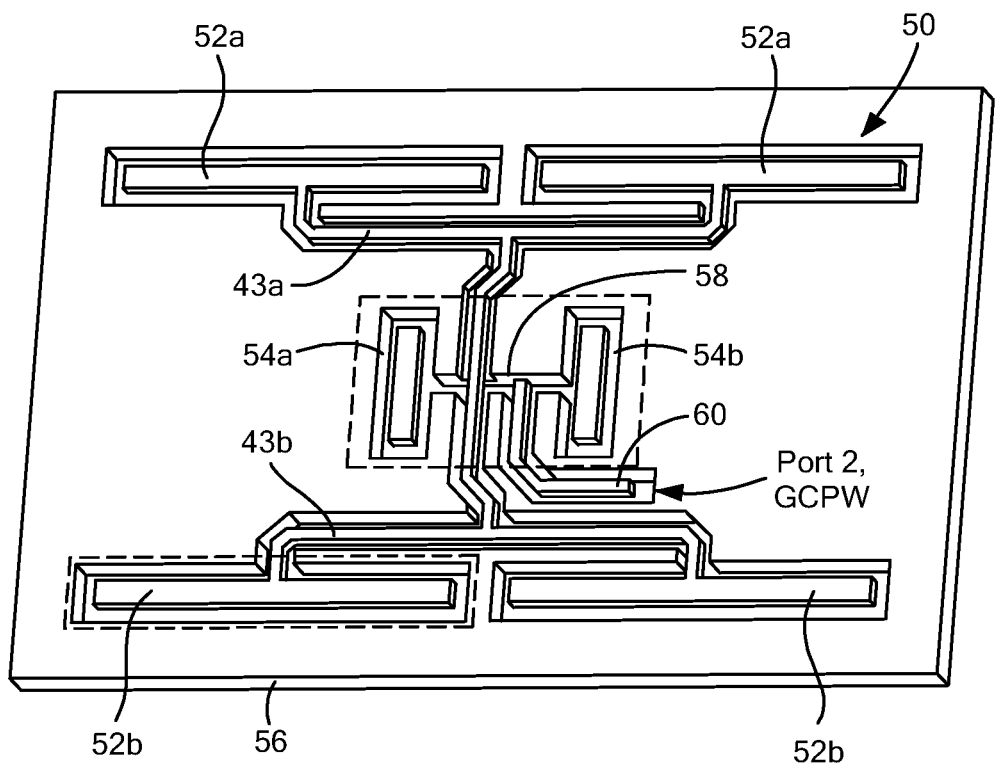
FIG. 6A is a top view of a SAC, according to some embodiments.
Figure 6B:
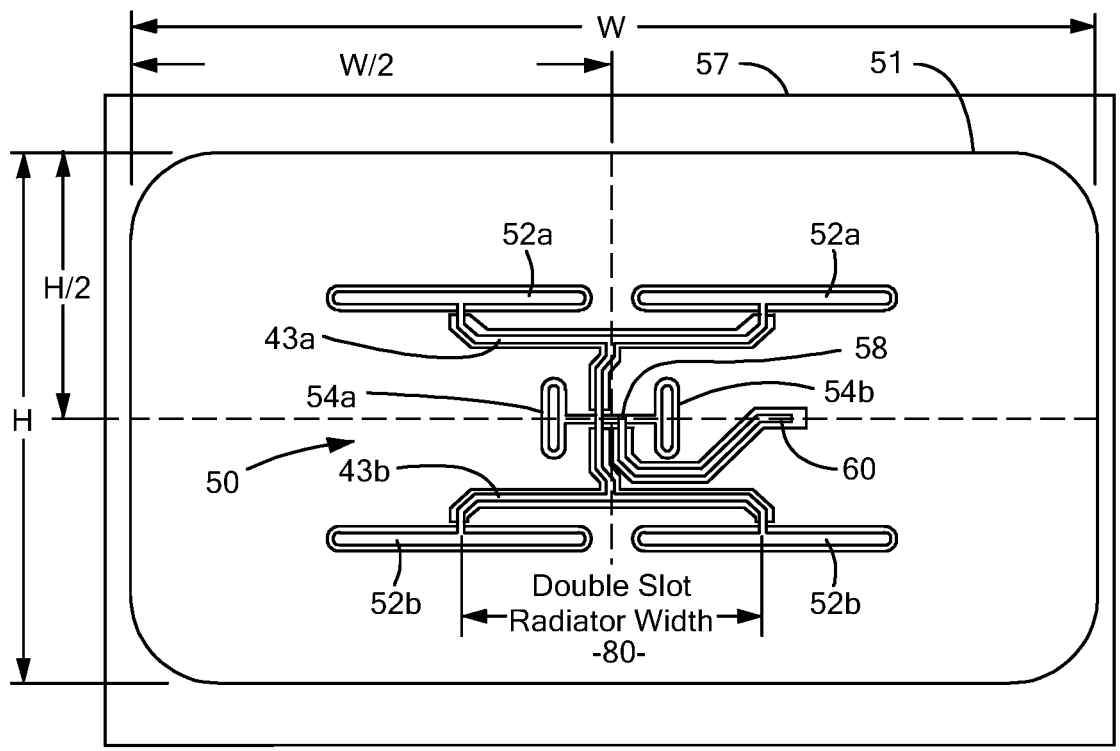
FIG. 6B is a top view of another SAC, according to some embodiments.

Illustrated in FIGS. 6A and 6B are embodiments of a SAC 50 disposed on a CMOS chip 56. The illustrative SAC 50 can be the same as or similar to SAC 20, 30, 90, 102, and/or 103 previously described in the context of FIGS. 1A, 4A, and 5. Included on the SAC 50 are two-by-two, double-slot radiators 52a, 52b that can collimate an RF signal, or beam, and radiate the RF signal downward through the silicon substrate of CMOS chip 50 into an aperture 51 of a waveguide (e.g., waveguide 24 of FIG. 1A). In order to efficiently couple an RF signal from one waveguide to another (e.g., from waveguide 24 to waveguide 34 in FIG. 1A), the array geometry is also shaped so that the electrical-field distribution at the silicon-waveguide interface matches the TE10 mode of the waveguide. In some instances, the simulated loss and 3 dB fractional bandwidth of the SAC 50 are 5.2 dB and 22%, respectively. The design of SAC 50 (and the CMOS chip 56 configuration) can be selected such that additional external components are not needed to transfer RF signals from one waveguide to another. Additionally, the configuration permits the wave to be confined inside the substrate of the CMOS chip and allows for robust clock operation despite variations in the chip architecture and environment. CMOS chip 56 shown in FIG. 6A may represent only a portion of a full CMOS chip 56 used in a particular application. For example, CMOS chip 56 of FIG. 6A may correspond to a portion of CMOS chip 31 shown in FIG. 1A which includes two SACs along with transmit and receive circuitry.

The SAC 50 illustrated in FIGS. 6A and 6B are integrated into a previously described CMOS chip such that there is a SAC for a transmitter and a second SAC for a receiver. SAC 50 comprises two ports. A first port corresponds to the waveguide (e.g., WR4.3 rectangular waveguide TE10 mode) that radiates an RF signal to the SAC 50 through the back-side of the CMOS chip. A second port (Port 2) comprises an on-chip grounded coplanar waveguide transmission line 60, also sometimes referred to herein as a grounded coplanar waveguide (GCPW).

In the example embodiment of FIGS. 6A, 6B, each SAC 50 includes four double-slot radiators (i.e. a first pair of double-slot radiators 52a and a second pair of double-slot radiators 52b) that together form an antenna array which couples RF signals between the chip on which the SAC is disposed and the waveguide over which the chip is disposed (e.g. ideally, highly efficient coupling of RF signals occurs between on-chip circuitry (e.g. transmit circuitry such as an RF source and/or receive circuitry such as a receiver) and the waveguide.

The placement of SAC 50 is demonstrated in FIG. 6B, which shows a single SAC 50 disposed over a waveguide aperture 51 having two pairs of parallel sides that are arranged orthogonally with respect to each other. The waveguide may be a rectangular waveguide that extends orthogonal to the page, away from SAC 50. The SAC 50 can be positioned over waveguide aperture 51 such a center of SAC 50 substantially aligns with a center of waveguide aperture 51 as shown in FIG. 6B. In more detail, waveguide aperture 51 can have a first pair of parallel sides of length W and second pair of parallel sides of length H. The relative position of the SAC 50 and waveguide aperture 51 can be selected such that a center of SAC 50 is approximately halfway along the length of the first pair of parallel sides (W/2) and approximately halfway along the length of the second pair of parallel sides (H/2), as shown.

The dimensions of SAC 50 can be chosen so that the SAC 50 fits on a CMOS chip 56 sized for a particular application (e.g., for use within a molecular clock). In some embodiments, a CMOS chip on which SAC 50 is disposed can have a dimension of 4000 um by 1250 um. In some instances, the double slot radiator pairs 52a, 52b can be separated by a double slot radiator width 80 selected to maximize an amount of RF signal radiated and received.

A first divider/combiner circuit 43a has a first port coupled to a first one 52a of the first pair of double slot radiators, a second port coupled to a second one 52a of the first pair of double slot radiators and a third port. A second divider/combiner circuit 43b has a first port coupled to a first one 54b of the second pair of double slot radiators, a second port coupled to a second one 54b of the second pair of double slot radiators and a third port. The third port of both the first and second divider/combiner circuits is coupled to a slot balun circuit comprising slot baluns 54a, 54b. Thus, RF signals are coupled between the first and second pairs of double-slot radiators 52a, 52b and GCPW port 60 via divider/combiner circuits 43a, 43b and the slot balun circuit.

The slot balun circuit further includes a connecting channel 58 disposed between opposite trenched areas (or channels) of the slot baluns 54a, 54b so as to help generate a differential feed for the slot array from the single-ended GCPW port 60. In some embodiments, by appropriately selecting the array configuration of the radiators 52a, 52b together with the configuration of the slot baluns 54a, 54b and the GCPW 60, no wafer thinning of the CMOS chip is required.

In some embodiments, SAC 50 can include a first pair of double slot radiators 52a, 52a (that together form a first radiating element array) and a second pair of double slot radiators 52b, 52b (that together form a second radiating element array). In some instances, these radiators can include a first pair of radiators 52a on one side of the SAC 50 and a second pair of radiators 52b on a second side of the SAC 50. As illustrated in FIG. 6A, in this illustrative embodiment the first and second pairs of radiators 52a, 52b are disposed on the same surface of a substrate. In other embodiments, the first and second pairs of radiators 52a, 52b may be disposed on opposing surfaces of the substrate.

Furthermore, it should be appreciated that in this illustrative embodiment, since RF signals are being coupled between the SAC 50 and a rectangular waveguide, the first and second pairs of radiators 52a, 52b are illustrated as being provided as double-slot radiators which are disposed or otherwise positioned opposite one another (i.e. the first and second pairs of double-slot radiators are disposed on the same surface of the substrate, but on opposite sides of the substrate as shown in FIGS. 6A, 6B). Such an arrangement of radiators forms an electric field configuration suitable for coupling to/from a rectangular waveguide. It should be appreciated that other radiator arrangements (i.e. both the selection of the specific type of radiating element, the number of radiating elements as well as the positioning of the radiating elements) may also be used as long as the selected arrangement results in an electric field configuration suitable for coupling to/from a rectangular waveguide. Further still, in embodiments in which it is desirable to couple RF signal from an IC to a waveguide having a shape which is not rectangular (e.g. a circular waveguide), the selection of the specific type of radiating element, the number of radiating elements as well as the positioning of the radiating elements should be selected to result in an electric field configuration suitable for coupling to/from the particular type of waveguide being used.

It should also be appreciated that SAC 50 is bidirectional and thus can function to receive or transmit an RF signal. For example, the radiators 52a, 52b can function to receive an RF signal from a waveguide or transmit an RF signal through a waveguide.

GCPW 60 can be configured to receive RF signals from circuitry disposed or otherwise provided on the CMOS chip, e.g. via a signal path such as hard-wired connection such as a coaxial cable or other type of transmission line. The GCPW 60 can be grounded to a metal structure (or "ground plane") 57 on the backside of the CMOS chip 56. Input to the GCPW 60 can be coupled (e.g. hard-wired) to either the receiver or transmitter circuitry installed on the CMOS chip and described herein.

For example, SAC 50 may receive an RF signal at GCPW port 60 and couple the RF signal through the slot balun circuit 54a, 54b, 58 to respective ones of combiner/divider circuits 43a, 43b, and subsequently to the first and second pairs of double slot radiators 52a, 52b which then radiate the RF signal into a waveguide (or into any wavelength limited channel which may be formed by a waveguide, for example). Alternatively, SAC 50 may receive an RF signal from a waveguide (e.g. via the first and second pairs of double slot radiators) and couple the RF signal through respective ones of combiner/divider circuits 43a, 43b, to the slot balun circuit 54a, 54b, 58, and subsequently to GCPW port 60.

Slot baluns 54a, 54b may be provided as nearly identical trenched geometries situated opposite one another. Slot baluns 54a, 54b can be trenched into the surface of the substrate (i.e., the CMOS chip). Thus, slot baluns 54a, 54b have a floor and sides comprised largely of substrate. The geometry of the slot balun circuit, comprising slot baluns 54a, 54b and connecting channel 58, is such that it serves to isolate signals traveling from GCPW 60 to radiators 52a, 52b and vice versa. The slot balun circuit be used to direct the RF signal and further isolate it from the vertical signals radiating to and from the double slot radiators 52a, 52b. It should be appreciated that the geometry and dimensions of the slot balun circuitry can be selected to reduce the amount of RF signal lost during receipt or transmission. Additionally, the geometry and dimensions can be selected to optimize efficiency.

Figure 7:
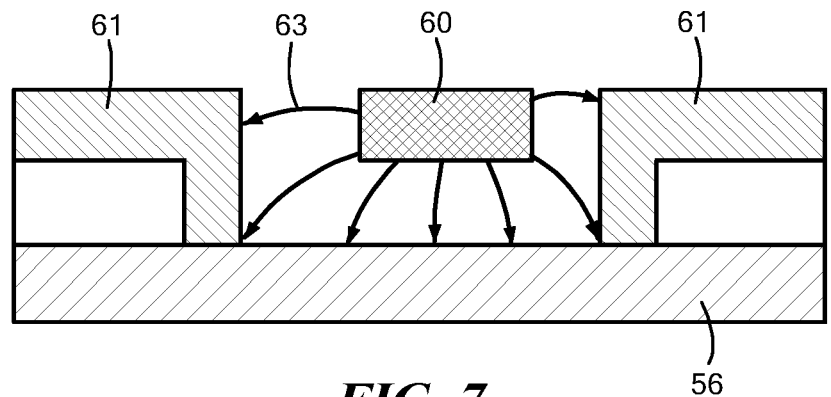
FIG. 7 is a side view of a grounded coplanar waveguide (GCPW), according to some embodiments.

FIG. 7 shows an illustrative GCPW 60 where the sides of the substrate 61 together with metal structure 57 permit the GCPW 60 to radiate the RF signal along a predetermined line to the slot balun. As shown, the electric field 63 is largely contained within the space bounded by the substrate 61, the GCPW 60, and metal structure 57. GCPW 60 is a good isolator in that it is able to isolate a received signal from the signals radiated by double slot radiators of a SAC (e.g., SAC 50 of FIGS. 6A, 6B) and because it permits horizontal movement of the signal. This horizontal movement further isolates the radiated signals which are radiated vertically from the SAC and to the radiators thereof.

With reference to FIG. 7 and also FIGS. 6A, 6B, when a signal is received on GCPW 60, the signal propagates along the GCPW 60 and over a portion of the slot balun connecting channel 58 to the double slot radiators 52a, 52b where the RF signal is transmitted out through a waveguide. In the reverse, radiators 52a, 52b receive an RF signal transmitted through a waveguide, through the backside of the SAC (i.e. through the substrate) and propagate this signal over the connecting channel 58 portion to the GCPW 60. Once received by the GCPW 60, the signal propagates along the GCPW 60 over the hard-wired connection between the GCPW 60 and the circuitry on the CMOS chip to a receiver such as the receiver described herein.

Figure 8:
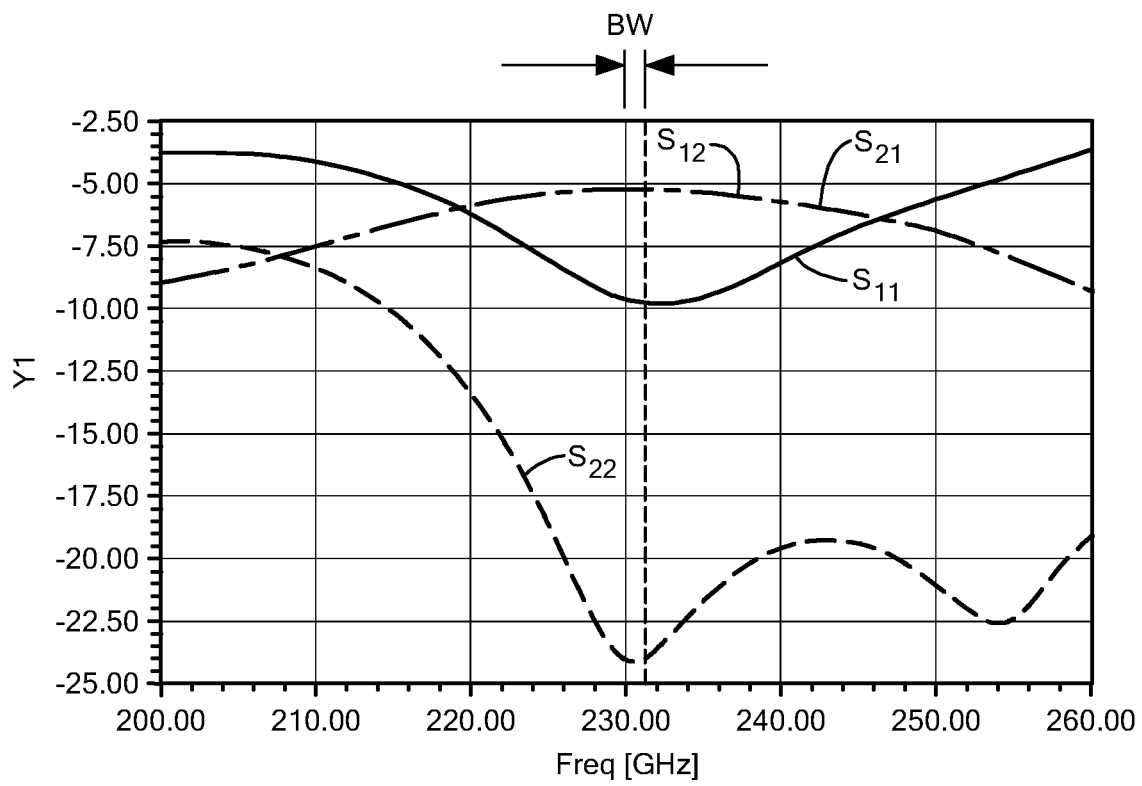
FIG. 8 is a plot of scattering parameters (S-parameters) of a SAC, according to some embodiments.

FIG. 8 is a plot of S-parameters of a SAC which may be the same as or similar to the SAC 50 illustrated in FIGS. 6A and 6B. As shown in FIG. 8, the SAC 50 presents an insertion loss of approximately 5.3 dB and 3 dB bandwidth of 46 GHz (20% relative bandwidth), with a center frequency of 231 GHz. In this example, a substrate conductivity of 10 S/m is assumed, since p-type doped silicon is generally used in a bulk CMOS process. With intrinsic silicon substrate (silicon on insulator (SOI) process) with 0 S/m conductivity, the loss of coupler may be reduced to 1.8 dB.

It should be noted that substrate mode rejection affects isolation of the transmitter and the receiver, and thus is a necessary characteristic to reduce cross-talk between the transmitter and the receiver which can degrade system performance. Isolation can be achieved by confining the field distribution of the SAC in the vertical direction of CMOS chip. By doing this, the variation of the longitude dimension of the CMOS chip does not affect the transmissivity characteristics of the slot-array coupler because the electromagnetic field is confined in the vertical direction.

In some instances, the antenna array of the SAC mimics or substantially matches the E-field distribution of the waveguide. This mimicking results in a strong coupling between the SAC and the waveguide and a wide bandwidth. The insertion loss is therefore reduced (and ideally minimized). In some embodiments, the insertion loss is about 5.3 dB, the bulk of which is loss due to the propagation of the signal through the CMOS chip or substrate.

Having described exemplary embodiments, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub-combination. Other embodiments not specifically described herein are also within the scope of the following claims.

The invention claimed is:

1. A slot array coupler comprising:
a semiconductor substrate having first and second opposing surfaces;
first and second pairs of double slot radiators disposed on a first one of the first and second opposing surfaces of the semiconductor substrate, the double slot radiators responsive to a radio frequency (RF) signal,
a first divider/combiner circuit having a first port coupled to a first one of the first pair of double slot radiators, a second port coupled to a second one of the first pair of double slot radiators and a third port;
a second divider/combiner circuit having a first port coupled to a first one of the second pair of double slot radiators, a second port coupled to a second one of the second pair of double slot radiators and a third port;
a slot balun circuit having a first port coupled to the third port of the first divider/combiner circuit and a second port coupled to the third port of the second divider/combiner circuit; and
a grounded coplanar waveguide (GCPW) transmission line having a first end corresponding to an input/output port of the slot array coupled and having a second end coupled to the slot balun circuit and configured to receive signals from or provide signals to the slot balun circuit.

2. The slot array coupler of claim 1 wherein the first and second pairs of double-slot radiators are disposed on opposite sides of the substrate.

3. The slot array coupler of claim 1 wherein the first and second pairs of double-slot radiators are configured to send/recieve RF signals to/from a rectangular waveguide.

4. The slot array coupler of claim 1 wherein the double slot radiators receive the RF signal via a backside of the substrate.

5. The slot array coupler of claim 4 wherein the coplanar waveguide propagates the RF signal in a horizontal direction towards the double slot radiators.

6. The slot array coupler of claim 1 wherein the grounded coplanar waveguide is configured to receive an RF signal from a transmitter circuit.

7. The slot array coupler of claim 6 wherein the coplanar waveguide receives the RF signal over a hard-wired connection installed between the coplanar waveguide and the transmitter circuit.

8. The slot array coupler of claim 7 wherein the coplanar waveguide propagates the RF signal across a channel formed within the slot balun circuit to the double slot radiators.

9. A system for propagating a radio frequency (RF) signal comprising:
   a first coupler in communication with a first waveguide, wherein the first coupler is configured to receive, via one or more double slot radiators installed on the first coupler, an RF signal propagating through the first waveguide, wherein the first coupler is configured to propagate the RF signal from the double slot radiators to a grounded coplanar waveguide installed on the first coupler, wherein the grounded coplanar waveguide is hard-wired to a receiver;
   the receiver electrically connected to the first coupler, the receiver configured to receive the RF signal from the first coupler;
   a transmitter electrically connected to the receiver and configured to transmit the RF signal to a second coupler electrically connected to the transmitter; and
   the second coupler in communication with a second waveguide, the second coupler configured to receive the RF signal and transmit the RF signal through the second waveguide.

10. The system of claim 9 wherein the transmitter is electrically coupled to the second coupler via a hard-wired connection between the transmitter and a grounded coplanar waveguide on the second coupler.

11. The system of claim 10 wherein the grounded coplanar waveguide is configured to propagate the RF signal received from the transmitter to one or more double slot radiators on the second coupler.

12. The system of claim 11 wherein the double slot radiators are configured to transmit the RF signal through the second waveguide.

* * * * *